(12) United States Patent
Duckworth et al.

(10) Patent No.: US 11,669,580 B2
(45) Date of Patent: *Jun. 6, 2023

(54) METHODS AND SYSTEMS FOR PROVIDING AN AUGMENTED REALITY INTERFACE FOR SAVING INFORMATION FOR RECOGNIZED OBJECTS

(71) Applicant: CAPITAL ONE SERVICES, LLC, McLean, VA (US)

(72) Inventors: Staevan Duckworth, Oak Point, TX (US); Daniel Martinez, Plano, TX (US); William Hardin, Dallas, TX (US); Victoria Blacksher, Plano, TX (US); Jonathan Castaneda, Plano, TX (US); Stewart Youngblood, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/506,318

(22) Filed: Oct. 20, 2021

(65) Prior Publication Data
US 2022/0043877 A1 Feb. 10, 2022

Related U.S. Application Data

(63) Continuation of application No. 16/516,453, filed on Jul. 19, 2019, now Pat. No. 11,204,974.

(51) Int. Cl.
*G06F 16/9538* (2019.01)
*G06F 16/583* (2019.01)
(Continued)

(52) U.S. Cl.
CPC ...... *G06F 16/9538* (2019.01); *G06F 16/5854* (2019.01); *G06F 16/9537* (2019.01);
(Continued)

(58) Field of Classification Search
CPC ............. G06F 16/9538; G06F 16/5854; G06F 16/9537; G06F 3/017; G06F 3/011;
(Continued)

(56) References Cited

U.S. PATENT DOCUMENTS 9,836,483 B1 12/2017 Hickman et al.
2015/0040074 A1 2/2015 Hofmann et al.
(Continued)

*Primary Examiner* — Richard L Bowen
*Assistant Examiner* — Aryan D Toughiry
(74) *Attorney, Agent, or Firm* — Finnegan, Henderson, Farabow, Garrett & Dunner, LLP

(57) ABSTRACT

A method includes displaying and capturing image data containing an object and accessing a plurality of records related to objects, selecting a record related to the captured object, obtaining an identifier of a vendor of the object of the selected data record, combining the selected data record and the vendor identifier to form a search record, displaying, based on the search record, an augmented reality interface to receive a first interactive action for saving the search record, receiving the first interactive action, saving, in response to receiving the first interactive action, the search record into a searchable data structure, receiving a second interactive action, retrieving, in response to receiving the second interactive action, the search record from the searchable data structure, updating the vendor identifier based on the retrieved search record, and displaying information related to the search record.

20 Claims, 12 Drawing Sheets

(51) Int. Cl.
*G06F 16/9537* (2019.01)
*G06T 11/00* (2006.01)
*G06Q 30/0601* (2023.01)
*G06V 20/20* (2022.01)
*G06F 3/01* (2006.01)

(52) U.S. Cl.
CPC .......... *G06Q 30/0625* (2013.01); *G06T 11/00* (2013.01); *G06V 20/20* (2022.01); *G06F 3/017* (2013.01); *G06V 2201/08* (2022.01)

(58) Field of Classification Search
CPC ... G06F 16/532; G06Q 30/0625; G06T 11/00; G06V 20/20; G06V 2201/08
See application file for complete search history.

(56) References Cited

U.S. PATENT DOCUMENTS

| | | |
|---|---|---|
| 2015/0317836 A1 | 11/2015 | Beaurepaire et al. |
| 2015/0379623 A1 | 12/2015 | Gadre et al. |
| 2016/0027307 A1 | 1/2016 | Abhyanker et al. |
| 2016/0093106 A1 | 3/2016 | Black |
| 2016/0217328 A1 | 7/2016 | Yanai et al. |
| 2017/0053002 A1 | 2/2017 | Bowman et al. |
| 2018/0150899 A1 | 5/2018 | Waldron et al. |
| 2018/0159838 A1 | 6/2018 | Dintenfass |
| 2018/0276543 A1 | 9/2018 | Parrotta et al. |
| 2018/0349703 A1 | 12/2018 | Rathod |
| 2019/0158524 A1 | 5/2019 | Zadeh et al. |
| 2019/0163975 A1 | 5/2019 | Desai et al. |
| 2019/0281030 A1 | 9/2019 | Isaacson et al. |
| 2020/0312029 A1 | 10/2020 | Heinen et al. |

200

METHODS AND SYSTEMS FOR PROVIDING AN AUGMENTED REALITY INTERFACE FOR SAVING INFORMATION FOR RECOGNIZED OBJECTS

CROSS REFERENCE TO RELATED APPLICATIONS

This application is a continuation of application Ser. No. 16/516,453, filed Jul. 19, 2019, now allowed. The above-cited Application is incorporated herein by reference in its entirety.

TECHNICAL FIELD

The present disclosure generally relates to methods and systems for providing an object recognition application and, more particularly, for providing an augmented reality interface on a mobile device facilitating capturing objects.

BACKGROUND

Identification of objects such as vehicles using computer-implemented image analysis is used in various applications. For example, license plate image recognition systems are frequently used in automated tollgates that identify moving vehicles to facilitate collecting tolls. In addition, systems that combine license plate recognition and detection of vehicle features, such as car color or make, are used to improve identification accuracy when the license plate cannot be adequately identified. For example, highly accurate vehicle identification based only on vehicle features is possible with techniques based on machine-learning algorithms such as convolutional neural networks. Such algorithms capture features from images of known vehicles and then identify an unknown vehicle in an image by correlating image features. Although such machine-learning techniques may be computationally intensive, they can improve identification accuracy and facilitate the automation of a vehicle image identification system.

Traditionally, image recognition of vehicles has focused on non-portable applications, such as the above-noted toll collection, monitoring the entrance of a parking lot, or supervising highway entrances. However, identification of vehicles using mobile or handheld devices is highly desirable for portable applications. For example, when a person sees a vehicle in the street and wants information about it, the person would normally need to approach the vehicle to determine details such as make or model. Alternatively, the person may need to browse multiple images and websites to try to find vehicle characteristics. Portable identification of vehicles using image analysis may facilitate the identification of vehicles without the burden of approaching the vehicle or perform later searches.

SUMMARY

Consistent with a disclosed embodiment a method for processing information about an object requiring recognition is provided. The method may include displaying a scene containing the object, receiving a request to capture image data of the scene, capturing the requested image data, and extracting image data of the object from the captured image data. The method may further include accessing a plurality of data records, the data records comprising image data of stored objects, selecting one of the data records based on a relationship between the image data of the stored objects and the extracted image data of the object, obtaining an identifier of a vendor of the stored object of the selected data record, and combining the selected data record and the vendor identifier to form a search record. The method may further include displaying, based on the search record, an augmented reality interface to receive a first interactive action for saving the search record, receiving the first interactive action, saving, in response to receiving the first interactive action, the search record into a searchable data structure, receiving a second interactive action, retrieving, in response to receiving the second interactive action, the search record from the searchable data structure, updating the vendor identifier based on the retrieved search record, and displaying information related to the search record.

Consistent with another disclosed embodiment, a method for processing information about an object requiring recognition is provided. The method may include displaying a scene containing the object, receiving a request to capture image data of the scene, capturing the requested image data, extracting image data of the object from the captured image data, and accessing a plurality of data records, the data records comprising image data of stored objects. The method may further include selecting one of the data records based on a relationship between image data of the stored objects and the extracted image data of the object, obtaining an identifier of a vendor of the stored object of the selected data record, combining the selected data record and the vendor identifier to form a search record accessible by a computing device, displaying, based on the search record, an augmented reality interface to receive a first interactive action for saving the search record, and receiving the first interactive action. The method may further include saving the search record into a database, in response to receiving the first interactive action, receiving a request to retrieve the search record using the computing device, retrieving the search record from the database, in response to the received request, updating the vendor identifier based on the retrieved search record, and displaying information related to the search record.

Consistent with another disclosed embodiment, a non-transitory computer-readable medium containing instruction is provided. The instructions may be executed by a processor, and result in operations that may include displaying a scene containing the object, receiving a request to capture image data of the scene, capturing the requested image data, extracting image data of the object from the captured image data, and accessing a plurality of data records, the data records comprising image data of stored objects. The operations may further include selecting one of the data records based on a relationship between image data of the stored objects and the extracted image data of the object, obtaining an identifier of a vendor of the stored object of the selected data record, combining the selected data record and the vendor identifier to form a search record, and displaying, based on the search record, an augmented reality interface to receive a first interactive action for saving the search record. The operations may further include receiving the first interactive action, saving the search record into a cloud based database, in response to receiving the first interactive action, the database having a web based interface allowing access to the search record from a remote computing device using a web browser, receiving, from the remote computing device, a request to retrieve the search record, retrieving the search record from the database by the remote computing device, in response to the received request, updating the vendor identifier based on the retrieved search record, and displaying, on the remote computing device, information related to the search record.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Embodiments of the present disclosure relate to portable identification of objects, such as vehicles, using object-recognition application that may be installed on a handheld device. Identification of vehicles using handheld devices is desirable, as handheld devices offer capabilities not available for other devices. For example, handheld devices may enable interactive applications that improve the user experience. Also, portable detection of vehicles using handheld devices may enable advertising opportunities. For example, a customer may use the handheld device to identify vehicles that the user is interested in purchasing. After identifying the vehicle, the user may receive information about the vehicle and location information about car dealers selling the vehicle. Thus, portable image recognition of vehicles enables new desirable applications.

The disclosed embodiments are related to systems and methods for processing information about an object requiring recognition, using an object-recognition application that may be installed on a client device (e.g., handheld device). In various embodiments, the object-recognition application may be used to capture images of objects and recognize various aspects of captured objects using the captured images. As used herein, the term "object" may refer to any suitable object that can be captured using a camera from a sufficiently close distance. In an example embodiment, the object may be a vehicle such as a car, a boat, a motorcycle, a bicycle, etc. The object may be captured from a distance that may range from one millimeter to several miles; however typical distances may include one foot to a few hundreds of feet.

Figure 1A:
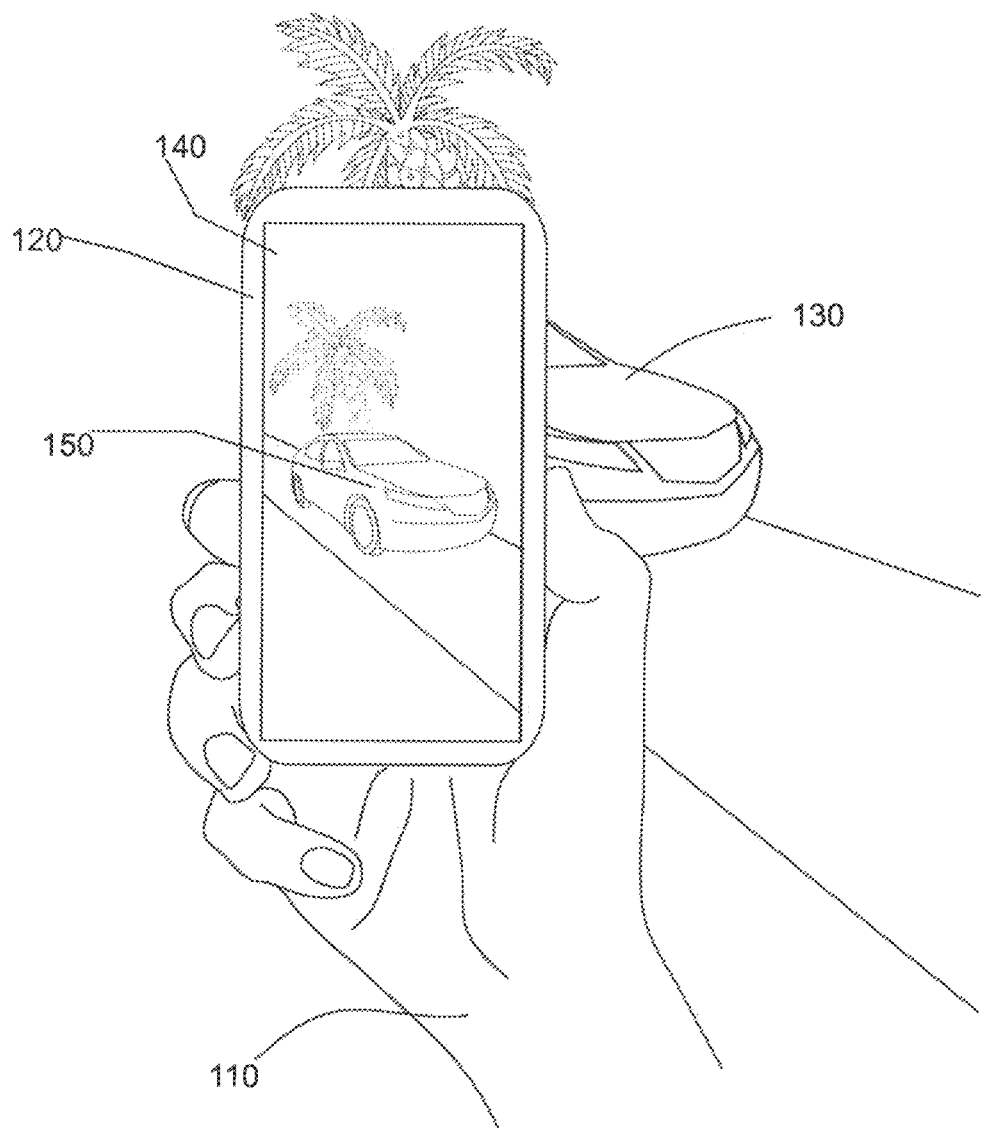
FIGS. 1A-1C show an illustrative device for capturing an object for object recognition consistent with disclosed embodiments.

Turning to the figures, FIG. 1A shows an illustrative client device 120 for capturing an object 130 for object recognition. In an example embodiment, client device 120 may be held by a user 110, who can point device 120 at an object 130 (e.g., a vehicle) for recognition.

Client device 120 shown in FIG. 1A may be a mobile computing device (e.g., a smartphone, tablets, laptop, or similar device), a gaming device, a wearable computing device such as virtual reality headset or another type of computing device (e.g., a desktop or workstation). Alternatively, client device 120 may be configured as a particular apparatus, embedded system, dedicated circuit, and the like based on the storage, execution, and/or implementation of the software instructions that perform one or more operations consistent with the disclosed embodiments. According to some embodiments, client device 120 may be configured to provide a web browser or similar computing application capable of accessing web sites, consistent with disclosed embodiments.

As used herein, the term "image" may be digital information stored in an appropriate format, for example, static image formats (e.g., bitmap, Graphics Interchange Format ("GIF"), Portable Network Graphics format ("PNG"), Joint Photographic Experts Group ("JPEG")) or dynamic formats (e.g., animated GIF, MPEG-4, Flash Video ("FLV"), or Windows Media Video ("WMV")). Client device 120 shown in FIG. 1A may have a screen 140 that depicts an object image 150 of object 130. In an example embodiment, object image 150 displayed on screen 140 may be a preview of an image of object 130 prior to object 130 being captured. Additionally, or alternatively, object image 150 may correspond to image data of object 130 after capturing object 130. As defined herein, unless otherwise noted, the term "capture" refers to a process of obtaining an image of an object (e.g., object 130) and saving the image onto a memory device (e.g., flash-drive). Client device 120 may include more than one computing/capturing device for capturing images of object 130.

While the term "capture" may refer to capturing an image of an object using a camera for capturing visible light, it should be understood that this term is not limited to visible light. For example, during the capturing process, infrared, ultraviolet, microwave and other radiation may be recorded. Additionally, or alternatively, other object-related information may be captured as well. For example, audio information related to the object may be captured. In an example embodiment, information related to ultrasound may be recorded.

Figure 1B:
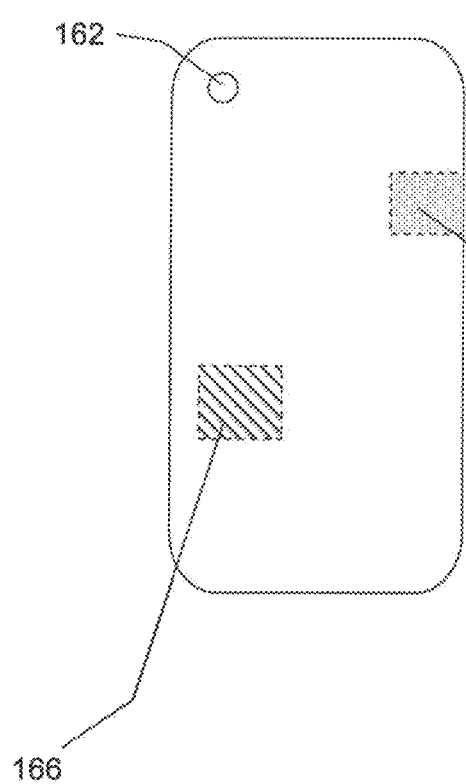

FIG. 1B shows a rear view of client device 120, depicting a capturing device 162 (e.g., camera). In some embodiments capturing device 162 may be a wearable camera that may interact/connect wirelessly or wiredly (herein the term "wiredly" is used to indicate that connection may include a physical wire) connecting device 162 with device 120. In some embodiments, more than one capturing device 162 may be used.

In various embodiments, capturing device 162 may comprise a visible-light camera, an infrared camera, an audio recording device, an ultrasound recording device, etc. While in many instances capturing device 162 may be a "passive device," that is a device that acquires the signals from an object without actively generating signals, in some embodiments, capturing device 162 may be an active device. For example, an active capturing device 162 may be configured to emit electromagnetic radiation (e.g., light via photoflash), ultrasonic signals, or other types of sound. For example, capturing device 162 may include an infrared laser source or a visible light laser source. Such sources may facilitate measuring distance between capturing device 162 and the object and assist in adjusting parameters of capturing device 162 based on the measured distance to the object.

In various embodiments, client device 120 may include a computer-readable storage medium 164, as shown in FIG. 1B, for storing instructions. Computer-readable storage medium 164 may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a subscriber identity module (SIM card) a memory stick, or the like. Computer-readable storage medium 164 may be configured with one or more software instructions, that when executed by a processor of client device 120, can cause client device 120 to perform operations according to the disclosed embodiments. In some aspects, storage medium 164 can be configured to store data that can be used by the software instructions.

In various embodiments, client device 120 may include a one or more location sensors and an input/output (I/O) system. The location sensor may determine a location of client device 120 and may include a Global Positioning System (GPS) receiver, Bluetooth transceiver, or WIFI transceiver. In various embodiments, client device 120 can be configured to determine geographic coordinates or identifiers, such as latitude or longitude based on data provided from one or more location sensor(s). Client device 120 can be configured to send the geographic coordinates or identifiers determined by the location sensor to other devices and/or systems via, for example, network 215.

The I/O system may include one or more devices configured to allow data to be received and/or transmitted by client device 120 and to allow client device 120 to communicate with other machines and devices. For example, the I/O system may include display 140 for providing information to the user. The I/O system may also include components for NFC communication. The I/O system may also include one or more digital and/or analog devices that allow a user to interact with client device 120 such as a touch-sensitive area, buttons, or microphones. The I/O system may also include one or more accelerometers to detect the orientation and inertia of client device 120.

The components of client device 120 may be implemented in hardware, software, or a combination of both hardware and software, as will be apparent to those skilled in the art.

Client device 120 may include a processor 166 configured to execute the stored software instructions. The processor may be a central processing unit (CPU) or a special-purpose computing device, such as a graphical processing unit (GPU), a field-programmable gate array (FPGA) or application-specific integrated circuits. In various embodiments, the processor may be part of a client device.

Client device 120 may include software that when executed by a processor performs Internet-related communication and content display processes. For instance, client device 120 may execute browser software that generates and displays various content found on the Internet. In some embodiments, client device 120 may be configured to execute software instructions relating to location services, such as GPS locations. For example, client device 120 may be configured to determine a geographic location and provide location data and time stamp data corresponding to the location data.

Figure 1C:
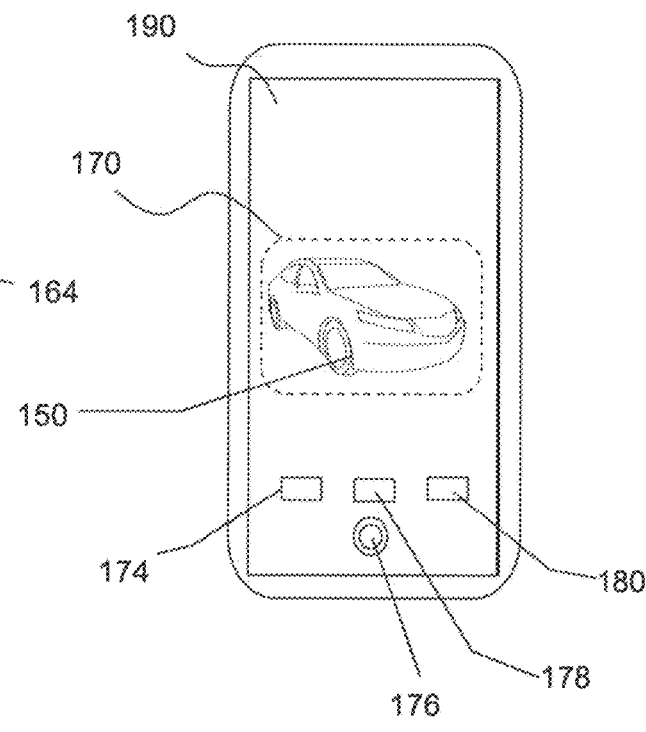

In various embodiments, user 110 may interact with client device 120 via an interface 190 interfacing with an object recognition-application 205 (FIG. 2) for capturing object 130. A process of user 110 interacting with object recognition application 205 may be referred to as a "capturing session" or "object-recognition session." In various embodiments, interface 190 may display object image 150 that may indicate how object 130 is going to be captured. Interface 190 may include one or more graphical user interface (GUI) components 174-180, as shown in FIG. 1C for manipulating client device 120 to change the manner in which object image 150, corresponding to object 130, is displayed. For example, a GUI component 174 may be used to zoom towards object 130 using capturing device 162, a component 176 may be used to initiate capture of an image corresponding to object 130, a component 178 may be used to change brightness when capturing object 130, and a component 180 may be used to indicate that a video related to object 130 needs to be captured. It should be noted, that other GUI components may be used to manipulate various aspects of client device 120 that are not limited to examples discussed above. GUI components 174-180 may include toolbars, buttons, sliders, and/or any other selectable graphics features. In various embodiments, GUI components may be combined with a natural user interface characterized by its ability to receive a user input by natural input methods, such as gestures. In an example embodiment, interface 190 may prompt user 110 to start an application, for example, pressing a button, using a gesture over a portion of the screen, using audio and/or video input, or the like.

In various embodiments, user 110 may manipulate device 120 resulting in changes in the manner in which the scene containing object 130 is displayed. For example, user 110 may manipulate device 120 via user gestures resulting in zooming in and out of the scene. Other examples of user 110 manipulating device 120 may include laterally moving client device 120 resulting in a lateral shift of a viewpoint for the scene, rotating client device 120 resulting in rotating the viewpoint for the scene, or moving client device 120 toward or away from object 130. Rotating client device 120 may involve rotating device 120 over a user selected angle about an axis that passes through a point of client device 120.

In various embodiments, interface 190 may be configured to assist user 110 in capturing an image associated with object 130 by presenting user 110 with a GUI component 170, such as a dotted rectangle as shown in FIG. 1C, for positioning object image 150 within a region of screen 140. In various embodiments, GUI component 170 may be any region detectable on screen 140 of client device 120. For example, component 170 may be a semitransparent region, such as a rectangle, a boundary of a transparent region detectable on screen 140 of client device 120, a set of disconnected boundary elements, a set of points (e.g., corners of a transparent rectangle), a circular boundary, a circular semitransparent region, and the like.

Figure 2:
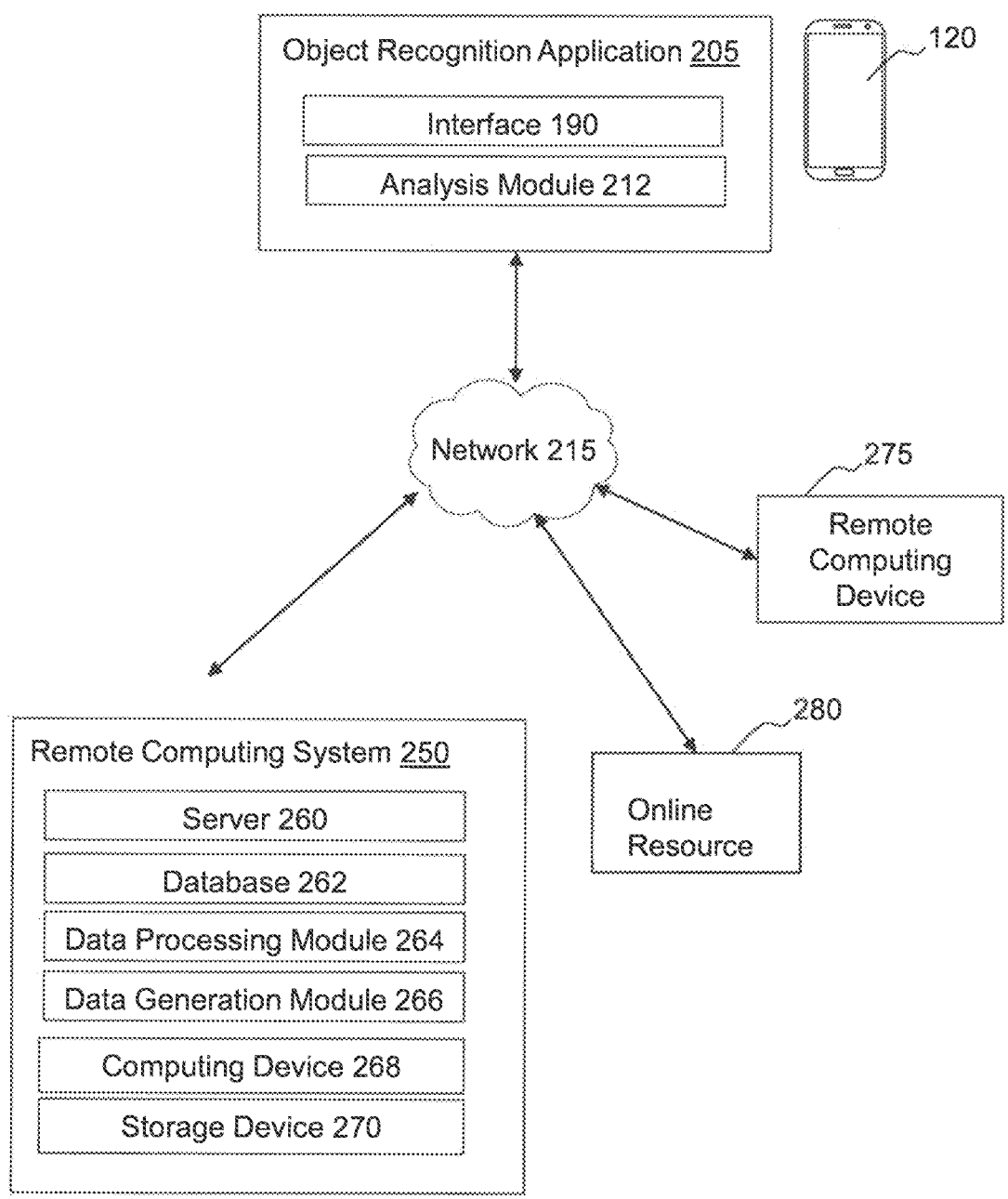
FIG. 2 is a diagram of an illustrative system for using an object-recognition application consistent with disclosed embodiments.

FIG. 2 is a block diagram of an exemplary system 200 for recognizing an object and for using object-recognition application 205 installed on client device 120. In addition to application 205, system 200 may include a remote computing device 275, online resources 280, and a remote computing system 250

In various embodiments, object-recognition application 205 may be a software application installed on client device 120. Object-recognition application 205 may have interface 190, and an analysis module 212 that may constitute separate software applications installed on client device 120.

As previously described, in various embodiments, user 110 may interact with client device 120 via interface 190 of object recognition application 205. Interface 190 may provide an option for user 110 to capture an image of object 130, as shown in FIG. 1C, or may present user 110 with various other options. In an example embodiment, interface 190 may prompt user 110 to access and view saved search results related to previously captured and recognized objects. As used herein, unless otherwise noted, the term "recognized object" refers to an object that has at least some minimal set of attributes (or characteristics) and that has been identified by object recognition application 205. For example, if the object is a vehicle, the vehicle may be recognized if make, model and year of the vehicle is identified. In some embodiments, the minimal set of attributes includes the attributes needed to locate a vendor selling the object. For example, an attribute of "blue" for a vehicle color may not be a sufficient minimal set of attributes for locating a vendor for the object, and vehicle make, model, year, and trim may be a sufficient minimal set of the attributes for the object. It should be noted that in some embodiments, object recognition application 205 may attempt to recognize an object using analysis module 212, and in some embodiments, image data for object 130 may be communicated via network 215 to remote computing system 250 for object recognition.

It should be noted that interface 190 may present user 110 with various options. For example, interface 190 may present user 110 with an option for filtering a search result by one or more attributes. For example, for objects which are vehicles, search results may be filtered by vehicle type, make, model, year, trim level, location of the vendor, popularity of the vehicle, vehicle reliability ratings, vehicle price, vehicle engine type, and the like. In some embodiments, interface 190 may be configured to update vendors for captured and recognized objects. For example, interface 190 may be configured to update price, location, and the like for a vehicle that was previously captured and recognized.

Various other options for interface 190 may further include options to save user information in user's profile, user's address, user's preferences (e.g., preferences for vehicle types that user is interested in finding), and the like. In some embodiments, interface 190 may be configured to provide user 110 with various advertising information related to saved searches. For example, interface 190 may present user 110 with information related to the best deals from vendors on vehicles that are similar to vehicles saved by user 110.

In various embodiments, following the capturing of image data related to object 130, analysis module 212 shown in FIG. 2 may be used to analyze the data to recognize attributes of the captured object 130 and to assign a match score that indicates a probability of successful recognition of object 130 or probability of successful recognition of at least one attribute of object 130. For example, if analysis module 212 estimates that object 130 is being recognized with a ninety percent certainty, the match score may be calculated to be 0.9. Thus, the match score may be a probability value associated with object recognition. Alternatively, the match score can be a function (e.g., a one-to-one function) related to a probability value associated with object recognition (e.g., for the probability of 0.9, the match score may be 90). As used herein, the term "match score" "recognition probability" or "likelihood" of correspondence of image data of object 130 to a stored image data for a data record related to attributes of the object 130 may be used interchangeably throughout this disclosure.

Analysis module 212 may be configured to determine, based on the match score, whether or not captured object 130 needs to be re-captured. As defined herein, the term "re-captured" refers to a process of repeating the capture of object 130. For example, if the match score is below an acceptable threshold, a second attempt at capturing object 130 may be required. An acceptable threshold may be sufficiently high to provide user 110 with sufficient confidence that captured object 130 has been recognized (e.g., the threshold may be larger than sixty percent, seventy percent, eighty percent, or ninety percent). If the match score is below the acceptable threshold, analysis module 212 may indicate, via interface 190, required changes to the image capturing process to improve the quality of the captured image/video data in order to increase the match score. For example, application 205 may indicate that user 110 should use device 120 manipulations that include moving a viewpoint towards object 130, moving the viewpoint relative to object 130, capturing object 130 using different parameters, and the like.

Alternatively, if a calculated match score is above the threshold, or if application 205 is determined that the match score cannot be improved (e.g., the match score does not improve or improves insignificantly with one or more consecutive attempts for capturing object 130), application 205 may terminate the object recognition session or may not suggest to re-capture object 130 for user 110. In some embodiments, application 205 may provide the match score to user 110 after a capturing attempt and/or may indicate to user 110 that object 130 has been successfully recognized.

In various embodiments, a match score (MS) for an object may be a set of match score numbers, $MS=\{MS_1, MS_2, MS_3 \ldots MS_n\}$, with each number $MS_i$ within the set of numbers corresponding to a match score for a specific attribute of captured object 130. For example, for captured object 130 being a vehicle, $MS_1$ may correspond to a match score number related to a make of the vehicle, $MS_2$ may correspond to a match score number related to a model of the vehicle, $MS_3$ may correspond to a match score number related to a trim of the vehicle, $MS_4$ may correspond to a match score number related to an engine type of the vehicle, and the like. In some embodiments, a single number for a match score may be calculated as a measure for a match score, that may be, for example, a weighted average of match score numbers. The weights for the weighted average may be chosen in any suitable way. For example, a weight for $MS_1$ corresponding to a match score number related to a make of the vehicle may be higher than the weight for $MS_4$ that may correspond to a match score number related to an engine type of the vehicle. In some embodiments, some of the match score numbers may correspond to "key" attributes of object 130, while other match score numbers may correspond to "secondary" attributes of object 130. For example, make and model of the vehicle may be key attributes, and the vehicle drivetrain may be a secondary attribute of object 130. In various embodiments, the weight of match score numbers corresponding to key attributes, may be higher than the weight of match score numbers corresponding to secondary attributes.

In some embodiments, MS may be a set of match score numbers that may correspond to a conditional probability for successful recognition of an attribute of object 130. For example, MS may be in a form $MS=\{MS_1, \{MS_{12}, MS_{22}\}, MS_3 \ldots MS_n\}$, where $MS_1$ may correspond to a match score number related to a make of the vehicle (e.g., $MS_1$ may be a probability that a vehicle is a Toyota), and $\{MS_{12}, M_{22}\}$ may correspond to a match score number related to a model of the vehicle (e.g., $MS_{12}$ may be a conditional probability of vehicle model being Camry, if the vehicle is Toyota, and $MS_{22}$ is a conditional probability of vehicle model being Altima, if the vehicle is not Toyota). It should be noted, that depending on an object requiring recognition, a match score may be any suitable set of score numbers.

In various embodiments, analysis module 212 may interact with remote computing system 250 to facilitate adequate recognition of captured object 130. In an example embodiment, module 212 may communicate the image/video data to remote computing system 250 for recognition of object 130.

Remote computing system 250 may include a server 260, a database 262, a data processing module 264, and a data generation module 266. In various embodiments, server 260, database 262, data processing module 264 and data generation module 266 may be software applications. In addition to the software applications, system 250 may include computing devices 268 and memory devices 270. Various aspects of the components of system 250 are discussed below.

In some embodiments, as shown in FIG. 2, application 205 and system 250 may be connected to a network 215. Components of application 205 and system 250 may exchange information via network 215 when necessary. For example, system 250 may provide upgrades to application 205 that may be communicated when application 205 is not in use and when application 205 is connected to the network. Additionally, or alternatively, application 205 may communicate with system 250 when it needs to transmit information to system 250 or receive information from system 250. In some embodiments, application 205 and system 250 may communicate frequently, and in some embodiments, components of application 205 may operate independently from remote computing system 250 for an extended period of time without connecting to network 215.

In various embodiments, network 215 may be any type of network that provides communications, exchanges information, and/or facilitates the exchange of information between application 205 and remote computing system 250. For example, the network 215 may be the Internet, a Local Area Network, a cellular network, a public switched telephone network ("PSTN"), or other suitable connection(s) that enables application 205 to send information to and receive information from remote computing system 250. A network may support a variety of electronic messaging formats and may further support a variety of services for application 205.

Remote computing system 250 may include one or more computing systems configured to perform operations consistent with identifying vehicle images. In some embodiments, system 250 may be associated with a cloud computing service such as Microsoft Azure™ or Amazon Web Services™. Remote computing system 250 may receive a request to identify an image from client devices 120. The request may include an image of a vehicle and, in some cases, the request may include a video file or a streaming video feed.

Referencing FIG. 2, remote computing system 250 may include one or more computing devices 268 and one or more memory devices 270. Computing device 268 may be a processor for executing the programming instructions, such as a central processing unit (CPU) or a special-purpose computing device, graphical processing unit (GPU), a field-programmable gate array (FPGA), or application-specific integrated circuit. Computing device 268 may include one or more computer clusters having a plurality of computing devices communicating with each other. For example, in some embodiments, a computer cluster may be a group of processors in communication through fast local area networks. In other embodiments, a computer cluster may be an array of graphical processing units configured to work in parallel as a GPU cluster. In such embodiments, a computer cluster may include heterogeneous or homogeneous hardware. In some embodiments, a computer cluster may include a GPU driver for each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster. In yet other embodiments, a computing cluster may operate with distcc (a program to distribute builds of C, C++, Objective C or Objective C++ code across several machines on a network to speed up building), and MPICH (a standard for message-passing for distributed-memory applications used in parallel computing), Linux Virtual Server™, Linux-HA™, or other director-based clusters that allow incoming requests for services to be distributed across multiple cluster nodes.

Memory device 270 may include a non-transitory computer-readable storage medium for storing programming instructions. The computer-readable storage medium may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, and the like.

Program instructions stored on a computer-readable storage medium may include assembler instructions, machine-dependent instructions, firmware instructions, source code, or object code written in any combination of one or more programming languages, including an object-oriented programming languages, procedural programming languages or functional programming languages. The programming language may be Fortran, Lisp, C++ or the like. The program instructions may be executed by one or more computing devices 268.

In various embodiments, server 260 may include computer-implemented methods (i.e., programming instructions) for exchanging information with application 205. The computer-implemented methods may be executed, for example, by at least one computing device 268. As described above, server 260, database 262, data processing module 264 and data generation module 266 may be software applications that may use one or more computing devices 268 and one or more storage devices 270. In various embodiments, object data (e.g., data related to object such as vehicles) may be collected on an ongoing basis by a software application of database 262 of system 250 to compile the data for database 262. In some embodiments, the data may be collected by visiting vehicle-related websites (e.g., websites associated with car manufacturers and/or car dealers).

Data processing module 264 of remote computing system 250 may be used to process images of the captured objects (e.g., object 130) received from client device 120 and recognize attributes of these images using artificial intelligence algorithms executed by one or more computing devices 268 used by data processing module 264.

Remote computing system 250 may include one or more databases 262 that may contain data related to objects being recognized by application 205. For example, database 262 may contain vehicle images, and vehicle attributes (e.g., model, make, year, and trim). Database 262 may include, for example, Oracle™ databases, Sybase™ databases, or other relational databases or non-relational databases, such as Hadoop™ sequence files, HBase™, or Cassandra™. Database 262 may include software components (e.g., database management system, database server, etc.) configured to receive and process requests for data stored in storage devices 270 of system 250 and to provide data from the database. Database 262 may be configured to collect and/or store data associated with objects (e.g., vehicles) and provide the data to client device 120 upon relating the captured vehicle to the stored data.

In various embodiments, a data record may be stored in database 262 for a vehicle with a given make, model, year, trim level, etc. The data record may include one or more images (also referred to as image data for the stored object) for the vehicle. For example, the images for the vehicle may be obtained from various websites. In some embodiments, image data for stored objects may include captured images from various users 110, provided that the captured images match other images related to the stored vehicle. In various embodiments, the data record may include information about the vendors offering the vehicle of the data record for sale.

Data processing module 264 may include one or more software applications that collect images of captured objects and process them to train an object-recognition model. The recognition model may include convolutional neural networks that determine attributes of the captured object based on extracted parameters. However, the object-recognition model may also include a regression model that estimates relationships between input and output variables. The object-recognition model may additionally sort elements of a dataset using one or more classifiers to determine the probability of a specific outcome. The object-recognition model may be a parametric, non-parametric, and/or semi-parametric model.

In some embodiments, the object-recognition model may include an input layer and an output layer connected via nodes with different activation functions as in a convolutional neural network. "Layers" in the neural network may transform an input variable into an output variable through a differentiable function. The convolutional neural network may include multiple distinct types of layers. For example, the network may include a convolution layer, a pooling layer, a ReLU Layer, a number filter layer, a filter shape layer, and/or a loss layer. Further, the convolution neural network may comprise a plurality of nodes. Each node may be associated with an activation function, and each node may be connected with other nodes via synapses that are associated with weights. The object-recognition model may include one or more neural networks (also referred to as artificial neural networks). The neural networks may model input/output relationships of variables and parameters by generating a number of interconnected nodes which contain an activation function. The activation function of a node may define a resulting output of that node given an argument or a set of arguments. The object recognition model may also include Random Forests, composed of a combination of decision tree predictors. (Decision trees may comprise a data structure mapping observation about something, in the "branch" of the tree, to conclusions about that thing's target value, in the "leaves" of the tree.) Each tree may depend on values of a random vector sampled independently and with the same distribution for all trees in the forest. The object-recognition model may additionally or alternatively include classification and regression trees, or other types of models known to those skilled in the art.

In various embodiments, data processing module 264 may complete an object recognition process by selecting a most probable data record corresponding to a vehicle identified within the image data that may correspond to captured object 130. For example, module 264 may select a most probable data record corresponding to captured image data of object 130. Module 264 may calculate a match score based on the selected most probable data record. In various embodiments, the match score may be communicated to application 205 and may be presented to user 110 via interface 190.

Remote computing system 250 may generate a data record corresponding to a captured object 130 using data generation module 266. For example, module 266 may generate a make, model, trim level, year, mileage and any other relevant information about a vehicle. Such record may be communicated to application 205 and presented to user 110 via interface 190. In some embodiments, the data record may be presented to user 110 when a calculated match score is higher than a threshold value, and the data record may not be presented to user 110 when the match score is lower than the threshold value.

In various embodiments, online resources 280, as shown in FIG. 2, may correspond to various dealership websites, auctions, etc. Online resources 280 may include computing resources such as servers or storage services configured to store an object related information (e.g., information about a vehicle). In some aspects, one or more servers or storage services can host one or more resources provided by one or more service providers. Online resources 280 may include pricing information, vehicle-related information, and financial information. In some embodiments, online resources 280 may include records of vehicle financing transactions, such as vehicle financing applications submitted by various vehicle buyers or vehicle pricing. Vehicle pricing information can include prices for the vehicles, monthly payment amounts, APRs, term lengths, warranty products typically purchased (e.g., tire protection plans, extended warranties), and/or amounts financed. Vehicle-related information can include vehicle make, model, vehicle identification number, color, trim level, mileage, dealership of lease or purchase, geographic area of lease or purchase (zip code, city, state, etc.), date of lease or purchase, and/or other information potentially affecting the price of a vehicle. In some embodiments, online resources 280 may provide information that can be stored in one or more databases (e.g., information from online resources 280 may be stored in database 262). The one or more databases can be configured to allow retrieval of the information according to one or more of pricing information, or vehicle-related information.

FIG. 2 further shows a remote computing device 275. Remote computing device 275 may be configured to access remote computing system 250 via a web-based interface and obtain data records for different objects. In an example embodiment, remote computing device 275 may be a desktop computer, a workstation, a server, and the like. In some embodiments, remote computing device 275 may communicate with server 260 via a web browser. Further use of remote computing device 275 is described below.

Figure 3:
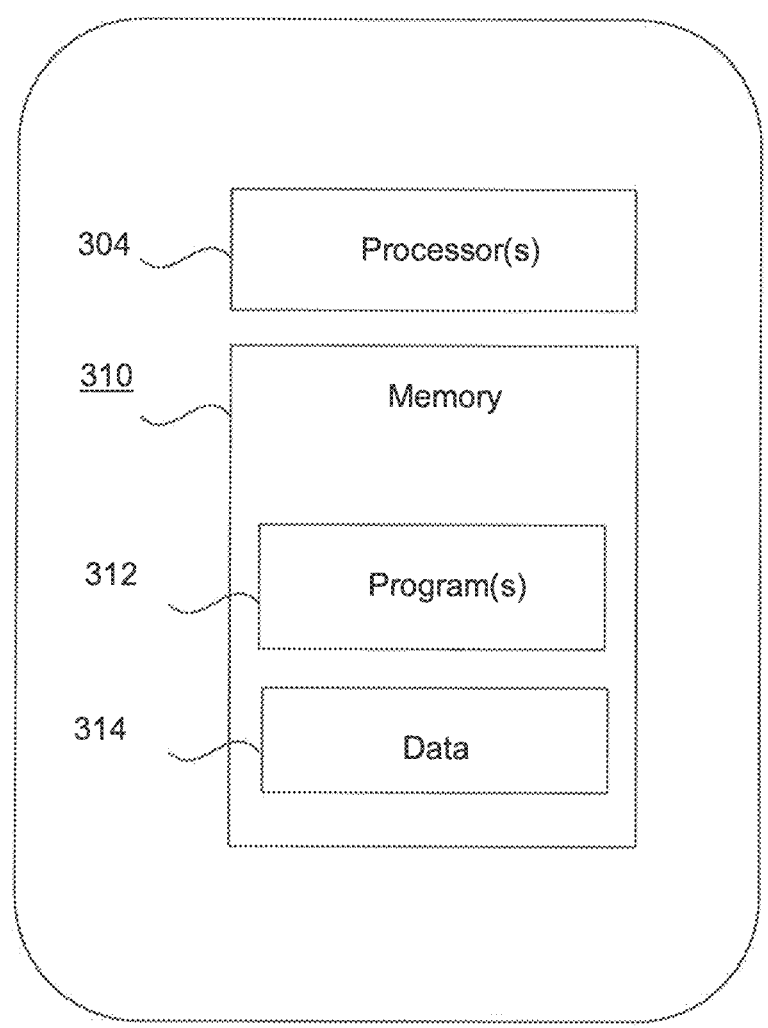
FIG. 3 is a diagram of illustrative components of a database consistent with disclosed embodiments.

FIG. 3 is a block diagram of database 262, consistent with disclosed embodiments. Database 262 may include one or more database processors 304, and a database memory 310 including one or more database programs 312 and stored data 314. In some embodiments, database 262 may be hosted on one or more computing devices (e.g., desktops, workstations, servers, and computing clusters).

The components of database 262 may be implemented in hardware, software, or a combination of both hardware and software, as will be apparent to those skilled in the art. For example, although one or more components of database 262 may be implemented as computer processing instruction modules, all or a portion of the functionality of database 262 may be implemented instead in dedicated electronics hardware.

Stored data 314 may be data associated with websites, such as online resource 280. Stored data 314 may include, for example, information from websites of vehicle dealers or vehicle manufacturers. Stored data 314 may include images of vehicles and information of vehicles, such as cost, condition, and dealers offering the vehicle. Stored data 314 may include vehicle inventory information for a particular vehicle dealership. Stored data 314 may include a map of a dealership lot and include specific location information for each vehicle in the dealership based on the map.

Figure 4A:
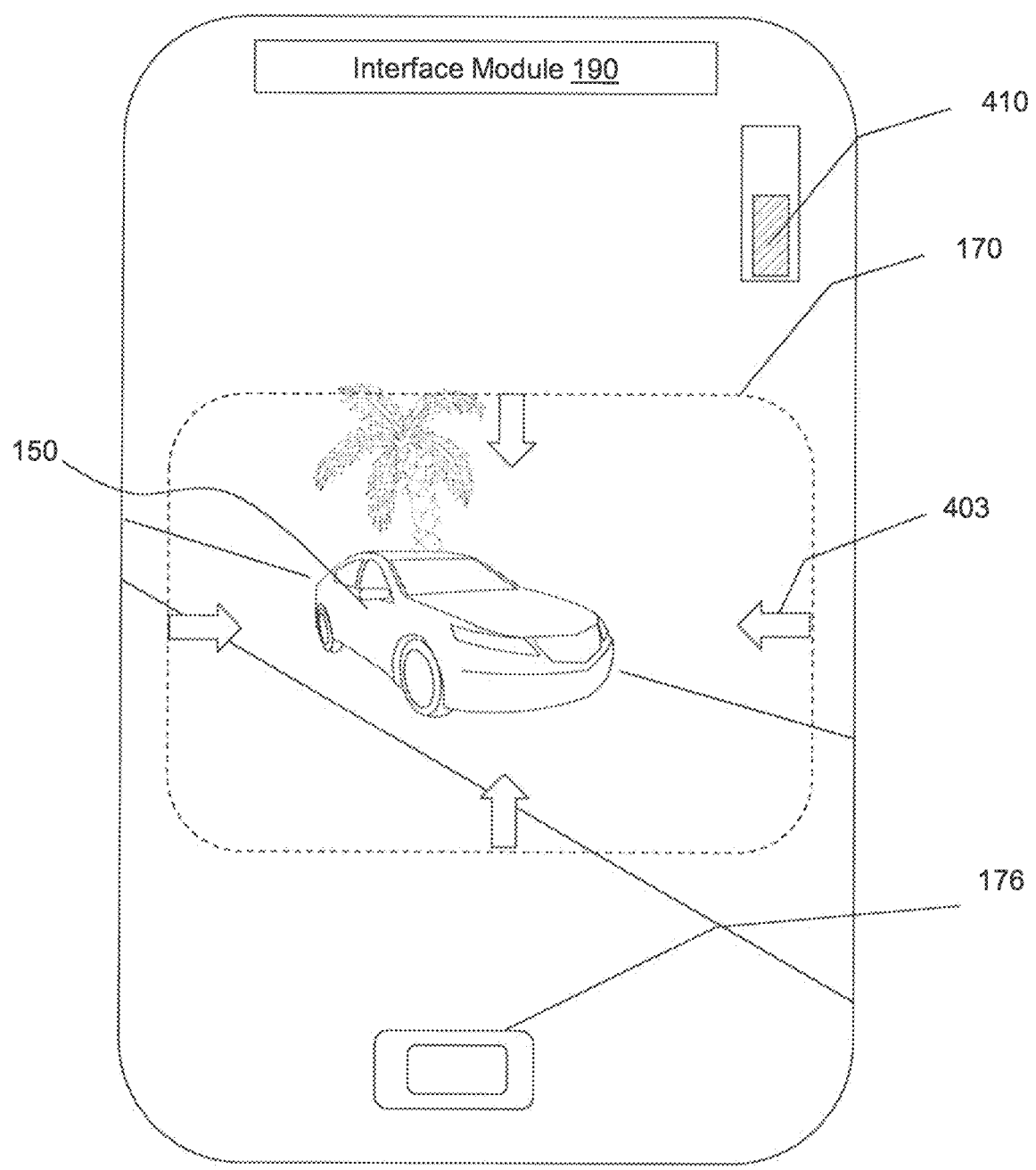
FIGS. 4A-4E are illustrative views of an object being captured using an object-recognition application, consistent with disclosed embodiments.

FIGS. 4A-4E are illustrative views of object image 150 displayed by application 205. In particular, FIG. 4A shows GUI component 170 that only partially overlays object image 150 representing captured object 130. Interface 190 may show a set of arrows (e.g., arrows 403 as shown in FIG. 4A) indicating how to move component 170 for best capture object 130. In some embodiments, interface 190 may display a message to instruct user 110 of client device 120 to physically adjust capturing device 162 (e.g., a camera of client device 120) to position object image 150 within GUI component 170.

FIG. 4A shows an example embodiment in which object image 150 corresponding to object 130 may be too small to successfully capture object 130. Arrows 403 may indicate that object image 150 corresponding to object 130 may need to be enlarged either by zooming towards object 130 using capturing device 162 or by moving client device 120 towards object 130. In various embodiments, interface 190 may provide a GUI component 410 that may indicate for user 110 the likelihood of capturing object 130. In an example embodiment, as shown in FIG. 4A, component 410 may be a bar, with the height of the bar indicating the likelihood of capturing object 130. In various embodiments, GUI component 410 may provide useful feedback to user 110 whether capturing of object 130 has been successful. In an example embodiment, the likelihood of capturing object 130 may depend on a distance between capturing device 162 and object 130, the viewing point for capturing device 162, and the like.

Figure 4B:
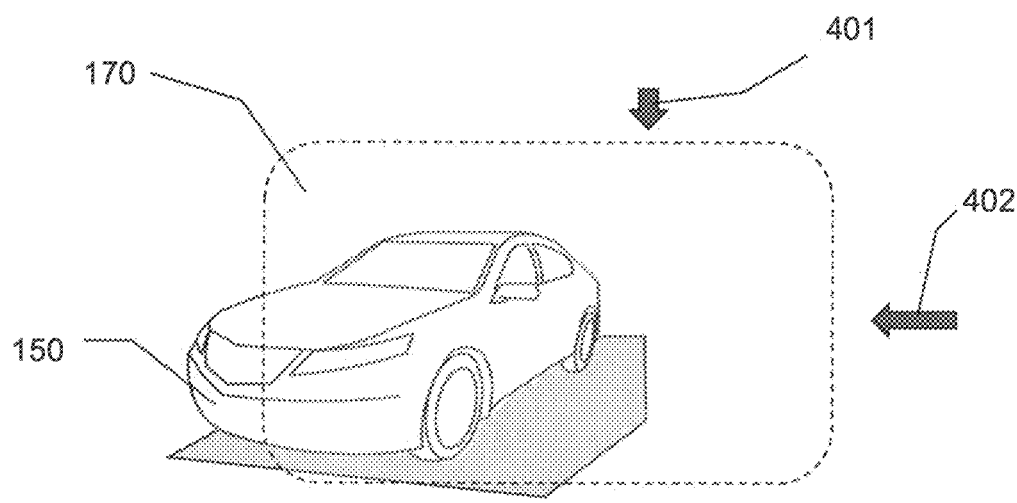

FIG. 4B shows GUI component 170 that only partially overlays object image 150 representing object 130. Interface 190 may show a set of arrows (e.g., arrows 401 and 402) indicating how to move component 170 for best capturing object 130. In some embodiments, interface 190 may display a message to instruct user 110 of client device 120 to physically adjust capturing device 162 (e.g., camera of client device 120) to object image 150 in a better location on screen 140 so that object 130 may be successfully captured.

Figure 4C:
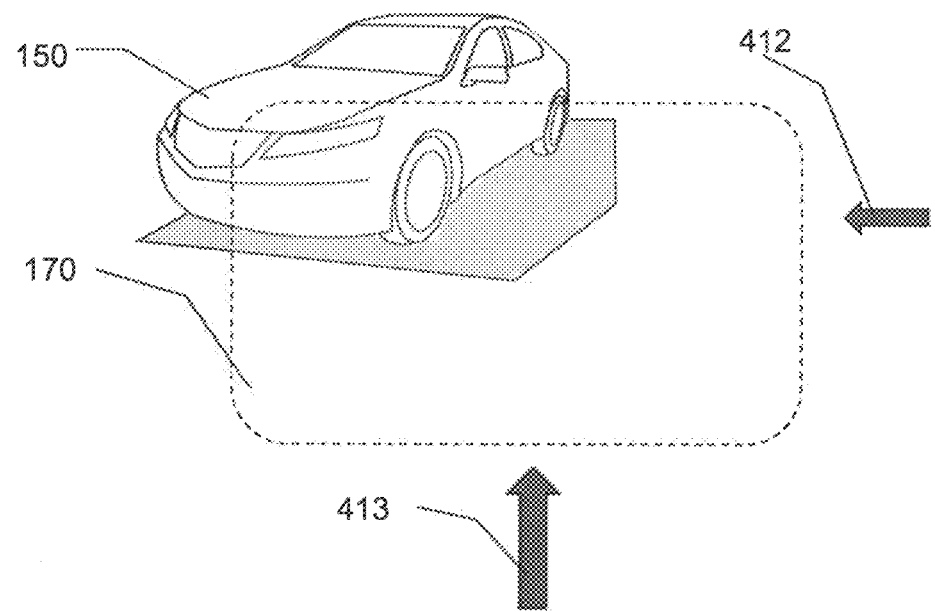

FIG. 4C shows another example embodiment in which GUI component 170 is misplaced, being slightly below and to the right of displayed object image 150. Arrows 412 and 413 indicate how component 170 may be moved to a better position by orienting capturing device 162 for capturing object 130. In some embodiments, the size of arrows 412 and 413 may indicate the amount of motion that is required by user 110 to adjust the position and orientation of capturing device 162 to successfully capture object 130.

Figure 4D:
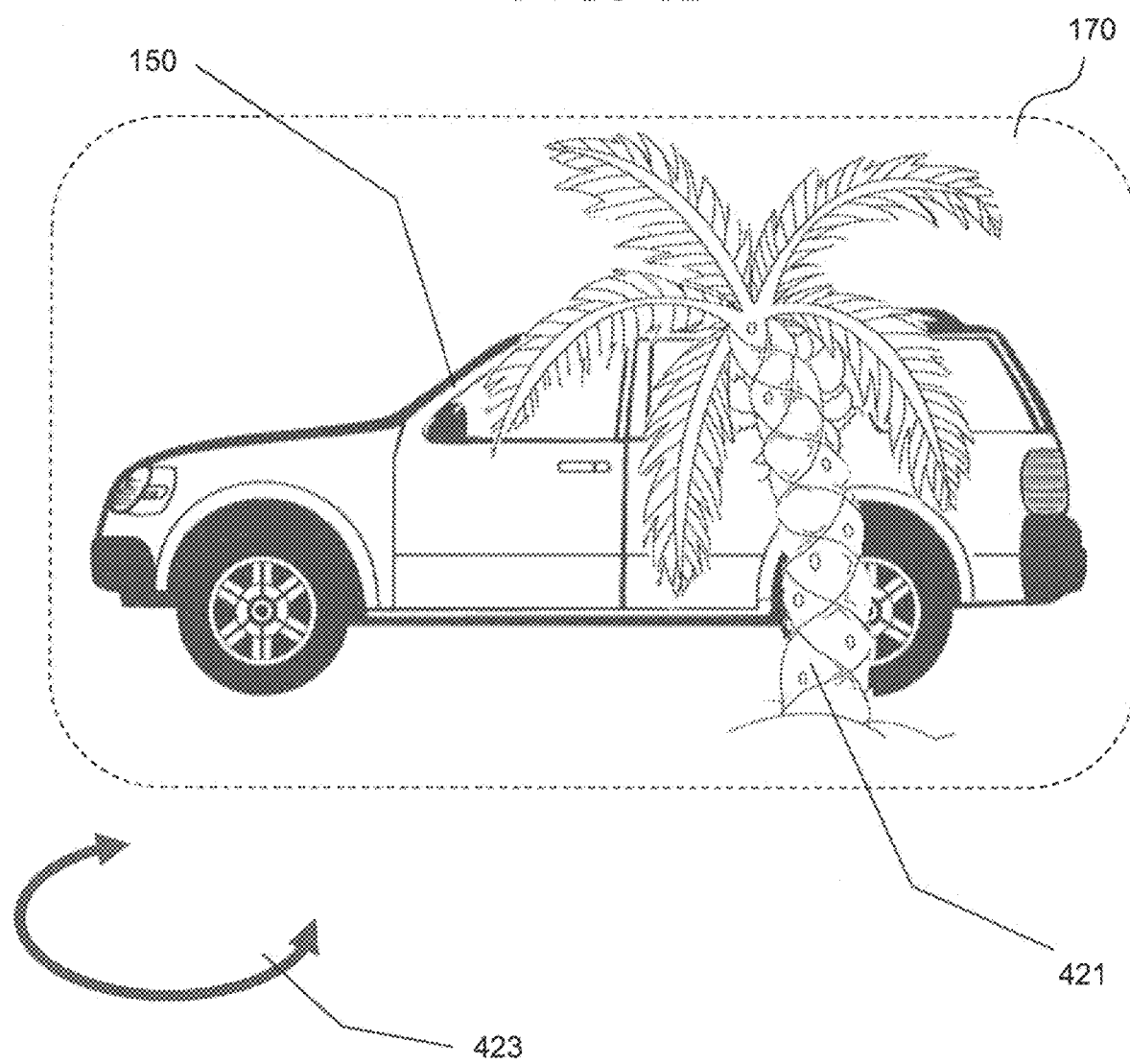

FIG. 4D shows an example embodiment in which a palm tree 421, obscures part of object 130. In an example embodiment, application 205 via interface 190 may indicate to user 110 using GUI component 423 that a new physical viewpoint needs to be selected in order to successfully capture object 130. For example, component 423 may indicate that user 110 needs to choose a different position by, for example, walking in front of (or behind) object 130, zooming towards of object 130, rotating capturing device 162, and the like.

Figure 4E:
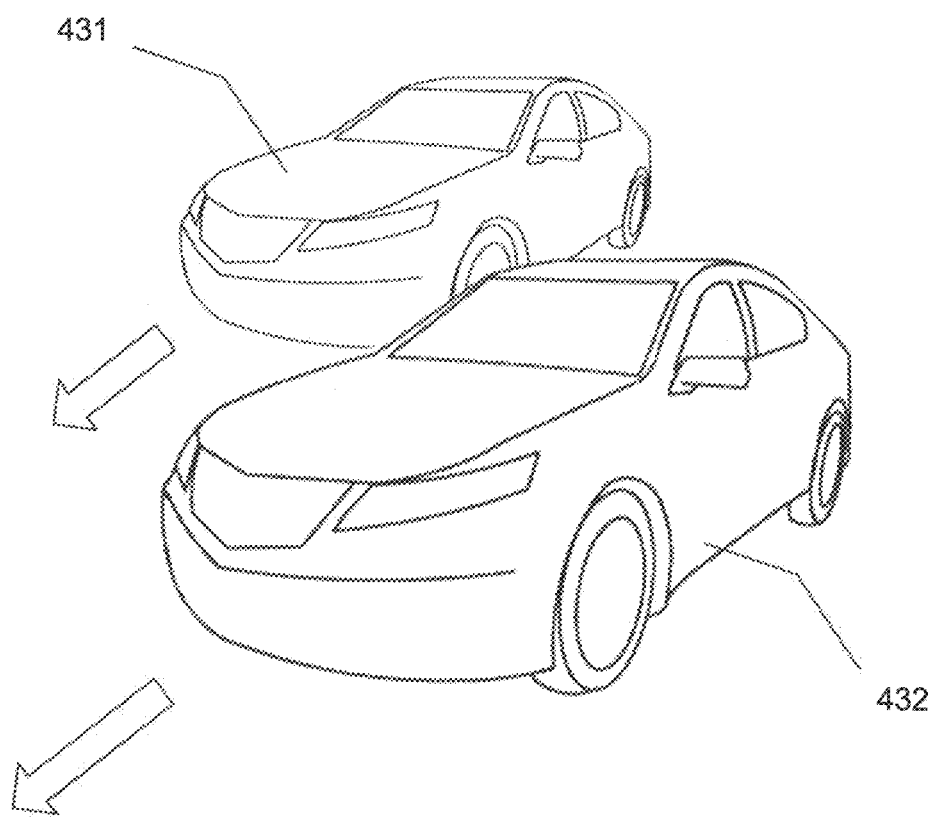

FIG. 4E shows that application 205 may enable user 110 to capture various objects, such as vehicles in motion. For example, user 110 may attempt to capture an object 431 partially obscured by another object 432. In various embodiments, application 205 may be configured to enable user 110 to perform operations for capturing moving objects (e.g., object 431 and object 432 are moving) and capture a set of frames for object 431 with various parts object 431 obscured by object 432. In an example embodiment, when sufficient data about object 431 has been captured, application 205 may inform user 110 via interface 190 that capturing video data (e.g., a set of frames) of moving object 431 can be completed. In some embodiments, during capturing object 431, application 205 may instruct user 110 to change orientation and/or position of capturing device 162, zoom in/out of object 431, and/or move capturing device 162 to track the motion of object 431.

Interface 190 of application 205 may be configured to record parameters of an environment of the capturing session for user 110. For example, application 205 may be configured to record the lighting conditions for user 110 during the capturing session, surroundings during the capturing session, and the like. In some embodiments, application 205 may run in the background and may be configured to record lighting conditions for user 110 when user 110 uses capturing device 162 to capture various images that may not be related to capturing sessions. The recorded information may be used to set default optimal parameters for capturing device 162 during a prospective capturing session. For example, if user 110 is generally conducting capturing sessions in the evening, parameters for capturing device 162 may be adjusted accordingly to provide adequate image resolution for captured objects (e.g., adjusting shutter speed, level of sensitivity of capturing device 162 to available light, etc.) during capturing sessions.

Information about user 110, client device 120, user 110 surroundings, and user 110 preferences during capturing sessions may be collected by interface 190 and stored in a user profile. Information in the user profile may be available to the object capturing and object recognition application.

Figure 5:
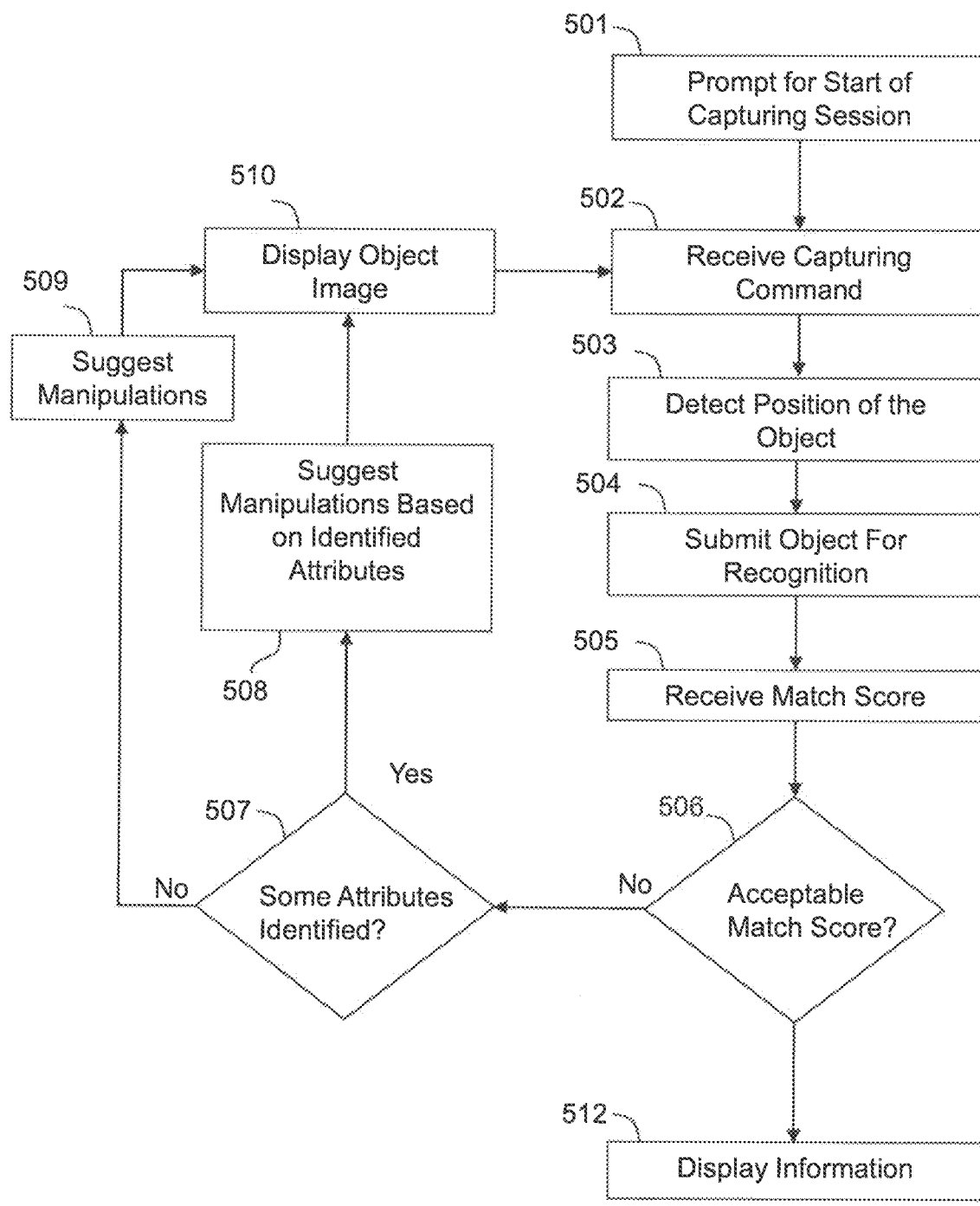
FIG. 5 is a flowchart of an example process of recognizing an object using an object-recognition application, consistent with disclosed embodiments.

FIG. 5 is a flowchart of an illustrative process 500 of capturing object 130 using object recognition application 205, consistent with disclosed embodiments. At step 501 of process 500, application 205 may prompt user 110 to start a capturing session and at step 502 application 205 may receive a capturing command from user 110. For example, user 110 may issue the capturing command by interacting with GUI component 176. At step 503, application 205 may detect the position of object image 150 within GUI component 170 as shown in FIG. 4A. In an example embodiment, at step 503, application 205 may provide simplified feedback to user 110 without communicating with remote system 250. In an example embodiment, application 205 may obtain a match score without communicating with remote computing system 250. For example, application 205 may calculate the match score by determining a position of object image 150 relative to a viewing area (e.g., a position relative to GUI component 170) and determining an orientation of object image 150 relative to a viewpoint of the capturing device 162. For example, the match score may be high if object image 150 is located in its entirety within GUI component 170 and if object 130 is viewed from a preferred direction (e.g., from the viewpoint shown in FIG. 4A as shown by object image 150). In an example embodiment, the match score may not be high for recognizing object 130 if object image 150 is only partially located within GUI component 170 (e.g., as shown in FIG. 4B or 4C) or if object 130 is viewed from a direction that may not be optimal for object recognition (e.g., from a viewpoint that is above the object or underneath the object).

At step 504, application 205 may submit captured still image/video data to remote computing system 250 for further processing (e.g., for image recognition using an object-recognition model). Additionally, or alternatively, application 205 may submit captured still image/video data to analysis module 212. Remote computing system 250 may attempt to recognize the captured data of object 130 and calculate a match score describing a likelihood of object 130 being recognized. As described above, the match score may include a set of match score numbers. In an example embodiment, application 205 may be configured to receive a match score from system 250 at step 505 and at step 506, compare the match score with an acceptable value for the match score. In an example embodiment, if the match score is a single number, application 205 may compare the match score with a predefined threshold. If the match score is a set of match score numbers, application 205 may compare the match score numbers with predefined thresholds, where a predefined threshold may correspond to a related match score number. If a match score is acceptable (e.g., there is a sufficient number of match score numbers that are above the corresponding thresholds, or there are some of the match score numbers corresponding to key attributes for object 130 that are above the corresponding threshold) (step 506, Yes) application 205 may proceed to step 512 and display recognized attributes of object 130. In addition to displaying attributes of object 130, various other information related to object 130 may be displayed. For example, at step 512, application 205 may display vendor information, location of vendors, price of object 130 requested by vendors, and the like.

If the match score is not acceptable (e.g., there is a sufficient number of match score numbers that are below the corresponding thresholds, or there are some of the match score numbers corresponding to key attributes for object 130 that are below the corresponding threshold) (step 506, No), application 205 may, at step 507 determine if some of the attributes of object 130 are identified. If some of the attributes are identified (step 507, Yes), application 205 may proceed to suggest to user 110 a way to manipulate device 120 to improve the match score at step 508 taking into account the identified attributes. For example, if object 130 (e.g., a vehicle) is identified to be a Toyota, then application 205 may suggest to user 110 to capture the back of the vehicle (e.g., the trunk view of the vehicle) that may display the model of the vehicle. If none of the attributes of object 130 are identified (step 507, No), application 205 may proceed to suggest to user 110 a way to manipulate device 120 to improve the match score at step 509.

In various embodiments, the manipulation of device 120 may include moving away from object 130 (e.g., a vehicle), approaching the vehicle, moving laterally relative to the vehicle, capturing the vehicle using different parameters, and the like. In various embodiments, the type of manipulation may be suggested using various visual or audio means (e.g., via on-screen messages, via arrow elements, or audio cues). In various embodiments, user 110 may manipulate device 120 in a way that may or may not be suggested by application 205. As a result of manipulations by user 110, application 205 may be configured to display object image 150 related to such manipulation at step 510 of process 500. For example, application 205 may be configured to display object image 150 representing a zoomed view of object 130, or display object image 150 corresponding to object 130 observed from a different viewpoint.

After completion of step 510, application 205 may be configured to repeat steps 502-510. In an example embodiment, steps 502-610 may be repeated while the match score unacceptable (step 506, No). If the match score is above the threshold value (step 506, Yes), application 205 may proceed to step 512 and display recognized attributes of object 130.

It should be noted, that in an example embodiment, if the match score is below the threshold value (step 506, No), and the number of attempts to capture object 130 exceeds an allowed maximum number of the sessions (such a situation may be described as failure to capture the object 130), process 500 may proceed to step 512. For cases when capturing of object 130 results in failure, application 205 may provide a response at step 512 that is different from the response provided when object 130 is determined to be recognized with a sufficiently high match score (i.e., the match score being higher than the threshold value).

Figure 6:
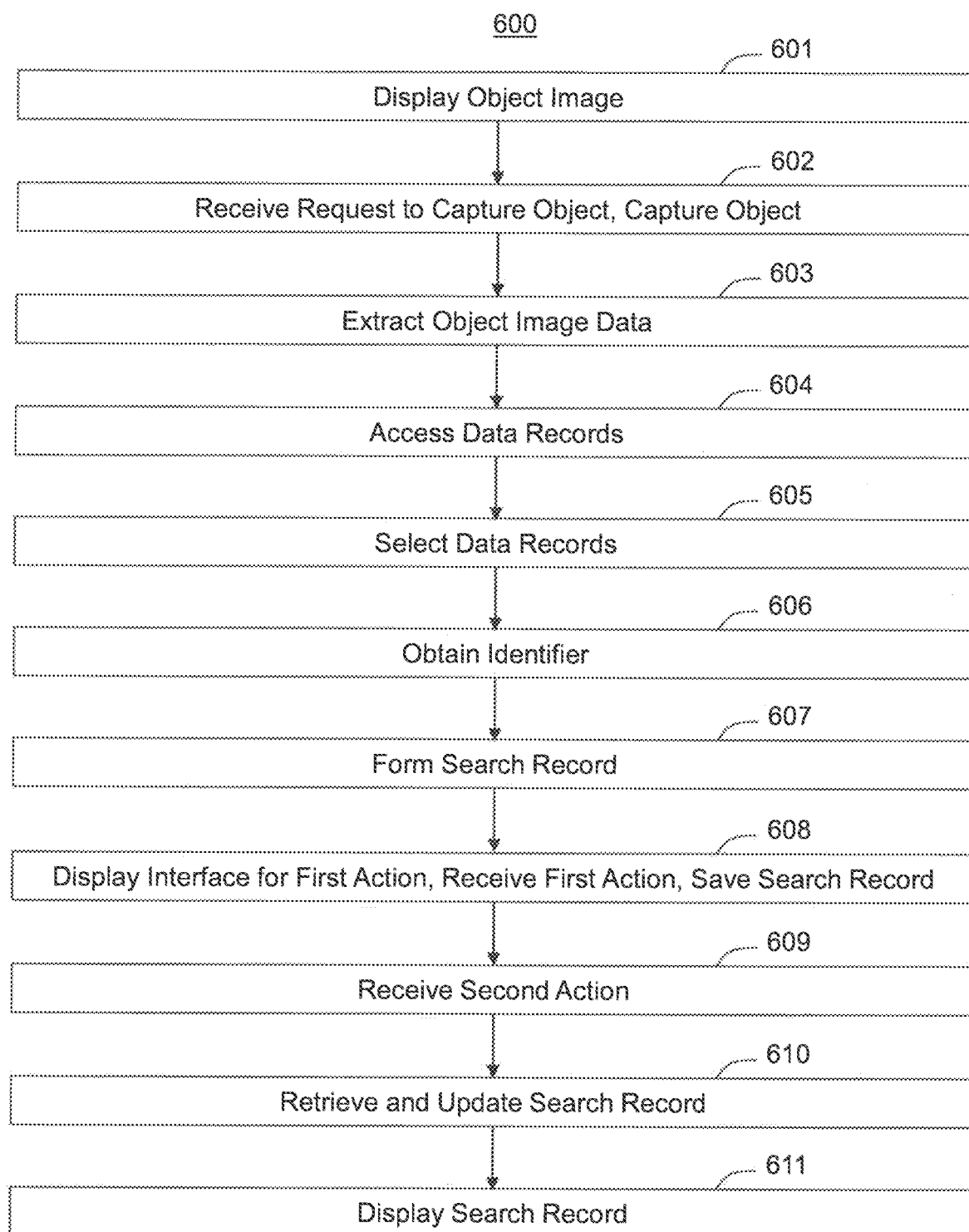
FIG. 6 is a flowchart of an example process of obtaining and saving a data record related to an identified object using an object-recognition application, consistent with disclosed embodiments.

FIG. 6 shows an example embodiment of a process 600 for obtaining, saving, and displaying information about an object using object recognition application 205. At step 601 of process 600, object image 150 corresponding to object 130 can be displayed via interface 190. At step 602, application 205 may receive a request to capture image data related to object 130. For example, user 110 may issue the capturing command by interacting with GUI component 176. At the same step 602, user 110 may capture image data associated with object 130. At step 603, application 205 may be configured to extracting image data related to object 130 from the captured image data related to object 130 and environmental elements presented within the image data (e.g., trees, buildings, etc.). For instance, analysis module 212 may be configured to recognize contours of the image of object 130 and extract regions of image data containing the image of object 130. Additionally, or alternatively, the image of object 130 may be extracted by a data processing module of the remote computing system 250.

At step 604 of process 600, application 205 may be configured to access a plurality of data records related to various image data of stored objects. In various examples, a data record for a vehicle may be make, model, trim level, mileage, manufacturer's suggested retail price, Kelley Blue Book® value, engine type, vehicle history, vehicle repair history, vehicle age, vehicle color, vehicle drivetrain, and the like. In some cases, the data record for a vehicle may include vendors of the vehicle, vehicle location, financing available for the vehicle, popularity of a vehicle among a group of people that have common characteristics (e.g., age, occupation, salary, location, etc.). In various embodiments, a data record for an object (e.g., vehicle) may include one or more images of the object. In an example embodiment, images of the object from different viewpoints may be associated with the data record. In some embodiments, images of a group of objects may be associated with a single data record. In some embodiments, various data records may be grouped or linked. For example, the data records corresponding to vehicles having the same make, model, and year may be linked, such that when one data record is accessed all or some of the linked data records are also accessed. In various embodiments, data records may be stored in database 262. In various embodiments, vehicle data records may be obtained from various dealership websites, vehicle auctions, and the like.

At step 605 of process 600, application 205 may be configured to select one or more of the data records from the plurality of data records, based on a relationship between image data of the stored objects and extracted image data of the object being captured (e.g., object 130). As defined herein, unless otherwise noted the term "relationship" between the image data of the stored object and the extracted image data of the object being captured refers to a likelihood (or a match score) that the stored object and the object being captured refers to the same data record. For example, if the object being captured is a 2016 Toyota Camry Hybrid LE, the application 205 may be configured to select all or some of the data records corresponding to images that match the image of the captured vehicle. For instance, application 205 may select data records related to the captured vehicle corresponding to vehicles that are offered for sale in the vicinity of a client device. It should be noted, that application 205 may provide a filter for filtering data records corresponding to a vehicle prior to selecting the data records. For example, application 205 may filter data records based on the location of the vehicle, a price of the vehicle, financing options for the vehicle, and the like.

Figure 7:
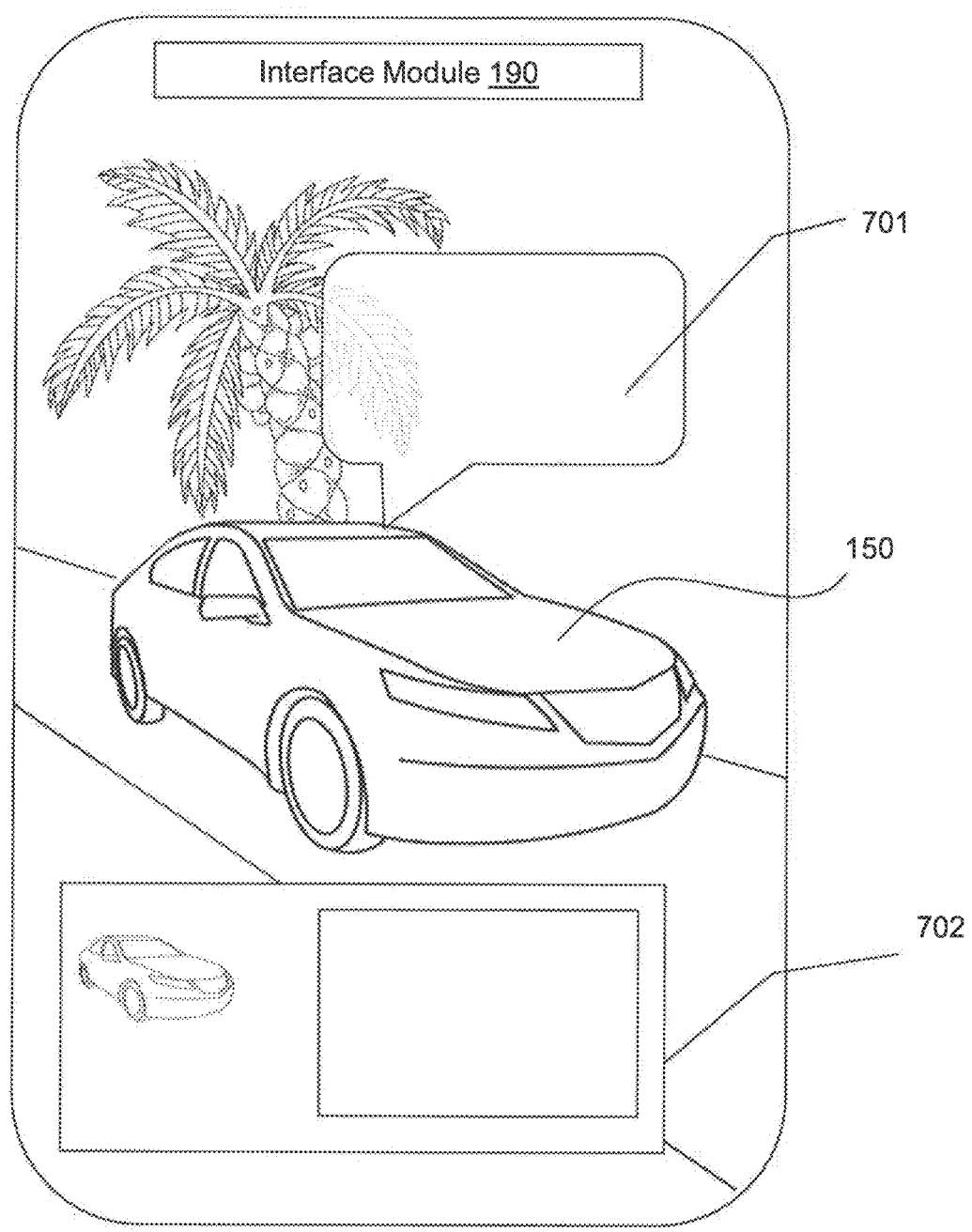
FIG. 7 is an example of an interface module containing a graphical user interface for saving a search record, consistent with disclosed embodiments.

At step 606, application 205 may be configured to obtain an identifier of a vendor of the stored object of the selected one or more data records. For example, the identifier may be a name of the vendor, a location of the vendor, and the like. In various embodiments, the identifier may include additional information for the vehicle such as a price for the vehicle, financing available for the vehicle, vehicle condition, vehicle history, and the like. At step 607 the identifier and the obtained data record may be combined to form a search record that may be stored. In an example embodiment, the data record may be combined with a set of vendors resulting in a set of search records that may be stored. At step 608, application 205 may present user 110 with an interface having a GUI component that may be used by user 110 to store the search record. For example, FIG. 7 shows interface 190 with GUI component 701 that may be an augmented reality interface for receiving an interactive action from user 110. In an example embodiment, the augmented reality interface may be a graphical overlay allowing user 110 to execute the interactive action using GUI component 701 while observing object image 150 displayed on screen 140. As used herein, unless otherwise noted, the term "interactive action" includes any suitable action of user 110 for interacting with a GUI component such as component 701 resulting in one or more commands for application 205. For instance, interactive action may include a user gesture, mouse clicks, a voice command, and the like. FIG. 7 shows an example of interface 190 containing GUI component 701 and a search record 702.

In various embodiments, user 110 may use one or more interactive actions for making a comment for search record 702. For example, user 110 may identify a search record as a "preferred choice," or may make any other suitable comments for the search record that may include text or graphics data related to a stored object, a vendor for the object, or the price of the object offered by a vendor. In some embodiments, interface 190 provides user 110 functionality for editing search record 702.

In various embodiments, user 110 may examine the search record 702 to ensure the correct recognition of the captured object. In various embodiment, if the object is not recognized (e.g., application 205 could not identify a related data record having a match score that is higher than a predetermined threshold) interface 190 may be configured to display a message for user 110 that the captured object was not identified. In some embodiments, the absence of displayed search record 702 may constitute a message for user 110 that the captured object was not identified. In various embodiment, interface 190 may be configured to display object image 150 corresponding to a captured object, the search record corresponding to the captured object, and GUI component 701, that may be an augmented reality interface overlaid over a portion of screen 140 as shown in FIG. 7.

In various embodiments, at step 608, application 205 may allow user 110 to save the search record via an interactive action into a searchable data structure. As used herein, unless otherwise noted, the term "searchable data structure" includes any suitable data structure that may be searched using keywords, dates, key numbers, and/or images. For example, user 110 may search the searchable data structure via a keyword that may correspond to the vehicle's make, model, etc. Additionally, or alternatively, user 110 may search the data structure using a date when an object was captured. In some cases, user 110 may search the data structure using an image of a vehicle previously captured by the user. In some embodiments, application 205 may be configured to allow user 110 to scroll through various search records saved in a searchable data structure. In an example embodiment, a search record within search records may be identified by an icon displaying an image of a vehicle related to the searched record.

In various embodiments, the searchable data structure may be saved in a database (e.g., database 262 of remote computing system 250). It should be noted, that any suitable database other then database 262 may be used. For example, application 205 may be configured to store the searchable data structure in a cloud-based database having a web-based interface. In some embodiments, the web-based interface may be provided by a remote computing system 250, and in some cases, any other suitable remote computing system may provide access to the data saved in the searchable data structure. In some embodiments, user 110 may have an associated user profile and a user webpage accessible via the web-based interface. The web-based interface may be configured to provide access to the searchable data structure from any suitable device connected to the internet (such as remote computing device 275). For example, the searchable data structure may be accessed from remote computing device 275 that uses a web browser. Additionally, or alternatively, the web-based interface may be configured to provide access to the searchable data structure from any suitable device connected to network 215. For example, the web-based interface may be configured to provide access to a desktop computer, a server, a workstation, and the like.

Figure 8:
FIG. 8 is an example of a map for identifying locations of vendors offering an object for sale, consistent with disclosed embodiments.

At step 609, application 205 may be configured to receive an interactive action from user 110 to retrieve the search record from the searchable data structure, in response to the interactive action. At step 610, application 205 may retrieve and update the search record, and at step 611 application 205 may display the search record via interface 190. As defined herein, unless otherwise noted, updating the search record may include updating the vendor information for the vehicle of the search record, updating the price of the vehicle of the search record, providing a list of new vendors for the vehicle or informing user 110 that the vehicle of the search record has been sold. In various embodiments, user 110 may update the search record by interacting with application 205. For example, user 110 may request to identify vendors of the vehicle of the search record that are within a certain radial distance from user 110. For example, FIG. 8 shows that interface 190 may be used to display vendors 804A-804D offering the vehicle of the search record for sale on a map 802. Map 802 may display vendors 804A-804D in the vicinity of user 110 located at a point 805 as shown in FIG. 8.

In some embodiments, user 110 may facilitate obtaining name and location of one or more vendors by selecting a chosen location (e.g., a location of a user, or any suitable location), selecting a chosen radial distance about the chosen location and selecting one or more vendors for the record object located at a distance from the chosen location that is no larger than the chosen radial distance.

In various embodiments, a cloud-based database for storing searchable data structure (or any other suitable remote computing system for storing searchable data structure and for allowing access to search records of the searchable data structure) may be configured to receive a request from a remote computing device (e.g., remote computing device 275) to retrieve one or more search records from the searchable data structure. For example, user 110 may access the searchable data structure via a web-based interface for the cloud-based database, where the web-based interface may be configured to provide user 110 with functionality to locate and retrieve a search record. In an example embodiment, user 110 may locate and retrieve the search record by browsing various saved search records, and in another example embodiment, user 110 may locate and retrieve the search record by searching the searchable data structure using keywords, dates, and the like.

In various embodiments, user 110 may update the search record within the searchable data structure via the web-based interface. For example, user 110 may request to identify vendors of the vehicle of the search record that are within a certain radial distance from user 110. In some embodiment, user 110 may update the search record (e.g., search for new vendors of the vehicle of the search record), leave comments for the search record, correct the search record (e.g., correct data in the search record, add images to the search record, and the like).

In some embodiments, system 200 may be configured to collect and analyze statistical data related to searches of user 110. In an example embodiment, system 200 may compare search records of various users 110 and find users with similar search records. For example, system 200 may be configured to find users that search for a similar type of vehicles. In some embodiments, system 200 may be configured to facilitate interaction between users that search for similar vehicles (e.g., system 200 may be configured to enable users to share comments related to a vehicle of their interest or participate in discussions related to the vehicle of their interest). In an example embodiment, system 200 may provide advertisements to users 110 tailored to user 110 based on the user 110 search records.

In some embodiments, system 200 may be configured to determine user search frequency and user search patterns and tailor advertising information based on user 110 search frequency and search patterns. For example, system 200 may be configured to increase advertising for user 110 if user search frequency is increasing. Additionally, or alternatively, system 200 may be configured to display advertisement based on user 110 search pattern. For example, if user 110 is searching for vehicles within a certain area, system 200 may be configured to provide user 110 with vehicles for sale within that area. Furthermore, in some embodiments, system 200 may provide information to user 110 on the popularity of a given vehicle at a given vendor. For instance, system 200 may inform user 110 how many users are interested in purchasing the given vehicle (e.g., a specific vehicle at a specific dealership, offered at a specific price), how many searches were conducted that led to the data record for the given vehicle, and the like.

In some embodiments, system 200 may be configured to analyze the search history of user 110 and identify the best vehicle (e.g., vehicle model and make) to advertise for user 110. Such vehicle may be a type of a vehicle that may likely attract user 110 attention, but may not necessarily be the vehicle that user 110 purchases. For instance, the advertising vehicle may be a high-end vehicle model, or it may be a vehicle model with high end options. In various embodiments, system 200 may be configured to advertise the vehicle for user 110, in order to entice user 110 to purchase a more affordable model that may be similar to the advertised model. In an example embodiment, system 200 may provide links to the more affordable model while advertising the high-end vehicle.

In various embodiments, system 200 may provide statistical information related to user 110 search history to various vendors to facilitate vehicle sales. In some cases, system 200 may record not only information related to vehicles searched by user 110 but also various statistical information related to user 110 on how user 110 interacts with object recognition application 205. For example, system 200 may be configured to record a time that user 110 took for capturing object 130, the number of capturing sessions for user 110 for the same object (e.g., user 110 may take multiple images of object 130 from different angles to ensure that object 130 is recognized), the degree of accuracy/perfection exhibited by user 110 when capturing objects 130 (e.g., user 110 may always capture objects from the same angle, with object image 150 fitting precisely into GUI component 170), consistency of capturing sessions (e.g., user 110 may always capture objects at a certain time during the day), consistency of type of vehicles captured by user 110 (e.g., user 110 always captures sport utility vehicles), etc. to attest the personal preferences for user 110 and to tailor advertisements for user 110 based on the personal preferences. For example, if user 110 is capturing sports utility vehicles sixty percent of the time and trucks forty percent of the time, system 200 may be configured to provide user 110 with advertisements for sports utility vehicles sixty percent of the time and advertisements for trucks forty percent of the time. Additionally, or alternatively, if user 110 exhibits great attention to detail (that can be deduced based on how painstakingly user 110 is capturing images of object 130), advertisements may present various vehicle details to user 110 (e.g., details of vehicle trim level, information about an engine of the vehicle, and the like). If user 110 is capturing a wide variety of vehicles, and/or if user 110 does not exhibit a fine attention to detail, and/or if user 110 captures vehicles at various geographical locations, system 200 may be configured to present advertisements to user 110 for a reliable vehicle that at a price corresponding to an average price of various vehicles identified in a search history for user 110.

As described above, user 110 may capture the same object (e.g., object 130) multiple times to ensure recognition of object 130. In various embodiments, system 200 may be configured to use multiple image data for object 130 to relate one data record to several images captured by user 110. In some embodiments, system 200 may enable user 110 to capture multiple images within the same capturing sessions, and in some embodiments, system 200 may compare various images (as well as other parameters for different capturing sessions such as time of the capturing sessions, location of the capturing sessions, etc.) between capturing sessions to establish that the images obtained during the capturing sessions correspond to the same object being captured. In some instances, system 200 may use some environmental identifiers (e.g., a tree in the background, a dent in the road) to establish that the images obtained during the capturing sessions correspond to the same object being captured.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. As used herein, unless otherwise noted, the term "set" means one or more (i.e., at least one), and the phrase "any solution" means any now known or later developed solution. Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for processing information about an object requiring recognition, comprising:
   displaying a scene containing the object;
   receiving a request to capture image data of the scene;
   capturing the requested image data;
   extracting image data of the object from the captured image data;
   accessing a plurality of data records, the data records comprising image data of stored objects;
   identifying probabilities that the data records are related to the image data of the object based on one or more features identified within the image data;
   selecting one of the data records based on the highest probability;
   obtaining a vendor identifier of a vendor of the stored object of the selected data record;
   combining the selected data record and the vendor identifier to form a search record;
   displaying, based on the search record and only when a probability that a data record is related to image data of the object is at least equal to a predetermined threshold, an augmented reality interface to receive a first interactive action for saving the search record;
   receiving the first interactive action;
   saving, in response to receiving the first interactive action, the search record into a searchable data structure;
   receiving a second interactive action to perform an updated vendor search based on the search record;
   retrieving, in response to receiving the second interactive action, the search record from the searchable data structure;
   updating the vendor identifier of the retrieved search record; and
   displaying information related to the updated vendor search.

2. The method of claim 1, wherein obtaining the identifier for the vendor comprises obtaining a name and a location of the vendor, respectively.

3. The method of claim 2, wherein obtaining the name and the location of the vendor comprises:
   selecting a chosen location;
   selecting a chosen radial distance about the chosen location; and
   selecting the vendor of the stored object of the selected data record, the vendor having a location at a distance from the chosen location that is no longer than the chosen radial distance.

4. The method of claim 1, wherein:
   the stored object is a vehicle, and obtaining the identifier for the vendor comprises obtaining the price of the vehicle, financing available for the vehicle, vehicle condition, and vehicle history.

5. The method of claim 1, further comprising obtaining a plurality of identifiers for a plurality of vendors.

6. The method of claim 1, further comprising obtaining a price of the stored object requested by vendor.

7. The method of claim 1, wherein the augmented reality interface comprises an interface for making a comment, the comment being at least one of text data or graphics data related to at least one of the stored objects, a vendor, or the price of the stored object.

8. The method of claim 1, wherein the augmented reality interface comprises an interface for editing the search record.

9. The method of claim 1, wherein updating the identifier comprises evaluating the probabilities using an artificial neural network.

10. The method of claim 1, wherein updating the search record comprises updating the vendor information for the stored object and updating the price of the stored object.

11. The method of claim 1, wherein displaying the augmented reality interface comprises providing an indication when the probability is less than the predetermined threshold.

12. The method of claim 1, wherein at least one of the first or the second interactive action comprises a gesture from a user.

13. The method of claim 1, wherein the augmented reality interface comprises a graphical overlay.

14. The method of claim 1, wherein capturing the requested image data comprises manipulating a viewpoint of the scene, wherein manipulating the viewpoint of the scene includes orienting a camera for capturing one or more unique features for identifying the object.

15. The method of claim 1, wherein the augmented reality interface allows the user to examine the search record to ensure correct recognition of the captured object.

16. A non-transitory computer-readable medium containing instructions, which when executed by a processor result in operations comprising:
    displaying a scene containing the object;
    receiving a request to capture image data of the scene;
    capturing the requested image data;
    extracting image data of the object from the captured image data;
    accessing a plurality of data records, the data records comprising image data of stored objects;
    identifying probabilities that the data records are related to the image data of the object based on one or more features identified within the image data;
    selecting one of the data records based on the highest probability;
    obtaining a vendor identifier of a vendor of the stored object of the selected data record;
    combining the selected data record and the vendor identifier to form a search record;
    displaying, based on the search record and only when a probability that a data record is related to image data of the object is at least equal to a predetermined threshold, an augmented reality interface to receive a first interactive action for saving the search record;
    receiving the first interactive action;
    saving, in response to receiving the first interactive action, the search record into a searchable data structure;
    receiving a second interactive action to perform an updated vendor search based on the search record;
    retrieving, in response to receiving the second interactive action, the search record from the searchable data structure;
    updating the vendor identifier of the retrieved search record; and
    displaying information related to the updated vendor search.

17. The non-transitory computer-readable medium of claim 16, wherein obtaining the identifier for the vendor comprises obtaining a name and a location of the vendor, respectively.

18. The non-transitory computer-readable medium of claim 17, wherein the obtaining the name and the location of the vendor comprises:
    selecting a chosen location;
    selecting a chosen radial distance about the chosen location;
    selecting the vendor of the stored object of the selected data record, the vendor having a location at a distance from the chosen location that is no larger than the chosen radial distance.

19. The non-transitory computer-readable medium of claim 16, wherein:
    the stored object is a vehicle; and
    obtaining the identifier for the vendor comprises obtaining the price of the vehicle, financing available for the vehicle, vehicle condition, and vehicle history.

20. The non-transitory computer-readable medium of claim 16, wherein the augmented reality interface comprises an interface for making a comment, the comment being at least one of text data or graphics data related to at least one of the stored objects, a vendor, or the price of the stored object.

* * * * *